US010423156B2

(12) United States Patent
Pulling et al.

(10) Patent No.: US 10,423,156 B2
(45) Date of Patent: Sep. 24, 2019

(54) REMOTELY-CONTROLLED DEVICE CONTROL SYSTEM, DEVICE AND METHOD

(71) Applicant: Aatonomy, Inc., San Francisco, CA (US)

(72) Inventors: Ronald Wilson Pulling, San Francisco, CA (US); Yang Hu, San Francisco, CA (US)

(73) Assignee: Aatonomy, Inc., Houston, TX (US)

( * ) Notice: Subject to any disclaimer, the term of this patent is extended or adjusted under 35 U.S.C. 154(b) by 0 days.

(21) Appl. No.: 15/808,886

(22) Filed: Nov. 9, 2017

(65) Prior Publication Data
US 2018/0164806 A1 Jun. 14, 2018

Related U.S. Application Data

(60) Provisional application No. 62/432,642, filed on Dec. 11, 2016, provisional application No. 62/432,643, filed on Dec. 11, 2016.

(51) Int. Cl.
G05D 1/00 (2006.01)
H04W 4/60 (2018.01)
G06Q 30/06 (2012.01)
G01S 19/01 (2010.01)

(52) U.S. Cl.
CPC ......... *G05D 1/0027* (2013.01); *G05D 1/0088* (2013.01); *G06Q 30/0601* (2013.01); *H04W 4/60* (2018.02); *G01S 19/01* (2013.01)

(58) Field of Classification Search
CPC ... G05D 1/0027; H04W 4/60; G06Q 30/0601; G01S 19/01

USPC .......................................................... 701/2
See application file for complete search history.

(56) References Cited

U.S. PATENT DOCUMENTS

| 8,805,110 B2 * | 8/2014 | Rhoads ............ G06F 17/30241 382/255 |
| 9,123,186 B2 | 9/2015 | Ricci |
| 9,364,950 B2 | 6/2016 | Izhikevich et al. |
| 2004/0024502 A1 | 2/2004 | Squires et al. |
| 2004/0077347 A1 | 4/2004 | Lauber et al. |
| 2014/0324253 A1 | 10/2014 | Duggan et al. |
| 2014/0379247 A1 | 12/2014 | Ferguson et al. |

(Continued)

FOREIGN PATENT DOCUMENTS

| WO | WO2016130719 | 8/2016 |
| WO | WO2017079222 | 5/2017 |

*Primary Examiner* — Gertrude Arthur Jeanglaude
(74) *Attorney, Agent, or Firm* — Kramer Levin Naftalis & Frankel LLP

(57) ABSTRACT

A system, device, and method for controlling a remotely-controlled device are disclosed. The remotely-controlled device control system could include one or more remotely-controlled devices; a controller comprised of a data collection module, at least one active module, at least one module description file (MDF), a robot description file (RDF) for each remotely-controlled device, and a processing unit (PU); at least one data source, and a marketplace. The PU may be configured to receive at least one active module; receive, for each received active module, input data of its associated MDF provided by the data collection module; generate, for each received active module, output data as a function of to the input data received by the processing unit, and provide the output data to a destination system.

20 Claims, 4 Drawing Sheets

(56) References Cited

U.S. PATENT DOCUMENTS

2015/0081156 A1 3/2015 Trepagnier et al.
2016/0025457 A1 1/2016 Miralles

* cited by examiner

REMOTELY-CONTROLLED DEVICE CONTROL SYSTEM, DEVICE AND METHOD

CROSS REFERENCE TO RELATED APPLICATIONS

This application claims priority to (1 U.S. Provisional Patent Application No. 62/432,642 entitled "MODULAR INTELLIGENCE PLATFORM FOR AUTONOMOUS ROBOTIC APPLICATIONS" that was filed on Dec. 11, 2016; and (2) U.S. Provisional Patent Application No. 62/432,643 entitled "DEVICES, SYSTEMS, AND METHODS FOR A CINEMATIC FOLLOWING" that was filed on Dec. 11, 2016, both of which are herein incorporated by reference in their entirety.

BACKGROUND

Remotely-controlled devices have become increasingly popular. For example, a wealth of drones (i.e., remotely-controlled devices or autonomous vehicles) have appeared in the market for hobbyists to enjoy; however, many drones, robots, and other types of remotely-controlled devices each rely on their own proprietary control methods. For example, Drone Manufacturer A may design a drone which programmatically turns left or right in a completely different way from Drone Manufacturer B. Because each manufacturer employs its own proprietary functionality or software, the functionality designed for use with Drone A is unlikely to be compatible with Drone B, and vice versa. As a result, it has heretofore not been practical to offer general software solutions to a broad customer base within this industry through a centralized, self-service marketplace.

SUMMARY

A modular intelligence platform for autonomous remotely-controlled applications is disclosed. The platform may include a general purpose computing device (or controller), a set of standards for the transfer of sensor and other data, and a mechanism for the aggregation of data, code modules which can be easily turned on, turned off, or exchanged, and make decisions on behalf of a connected robot, a set of standards for the communication of instructions to a robot, and a mechanism for aggregating and disseminating such instructions, and a marketplace from which such modules may be acquired In one aspect, embodiments of the inventive concepts disclosed herein are directed to a system for controlling remotely-controlled devices. The system could include one or more remotely-controlled devices; a controller comprised of a data collection module, at least one active module, at least one module description file (MDF), a robot description file (RDF) for each remotely-controlled device, and a processing unit (PU); at least one data source, and a marketplace.

In a further aspect, embodiments of the inventive concepts disclosed herein are directed to a device for controlling remotely-controlled devices. The device could include the PU configured to perform the method in the paragraph that follows.

In a further aspect, embodiments of the inventive concepts disclosed herein are directed to a method for controlling remotely-controlled devices. When properly configured, the PU may receive at least one active module; receive, for each received active module, input data of its associated MDF provided by the data collection module; generate, for each received active module, output data as a function of to the input data received by the processing unit, and provide the output data to a destination system.

BRIEF DESCRIPTION OF THE DRAWINGS

For a fuller understanding of the inventive embodiments, reference is made to the following description taken in connection with the accompanying drawings in which.

DETAILED DESCRIPTION

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1:
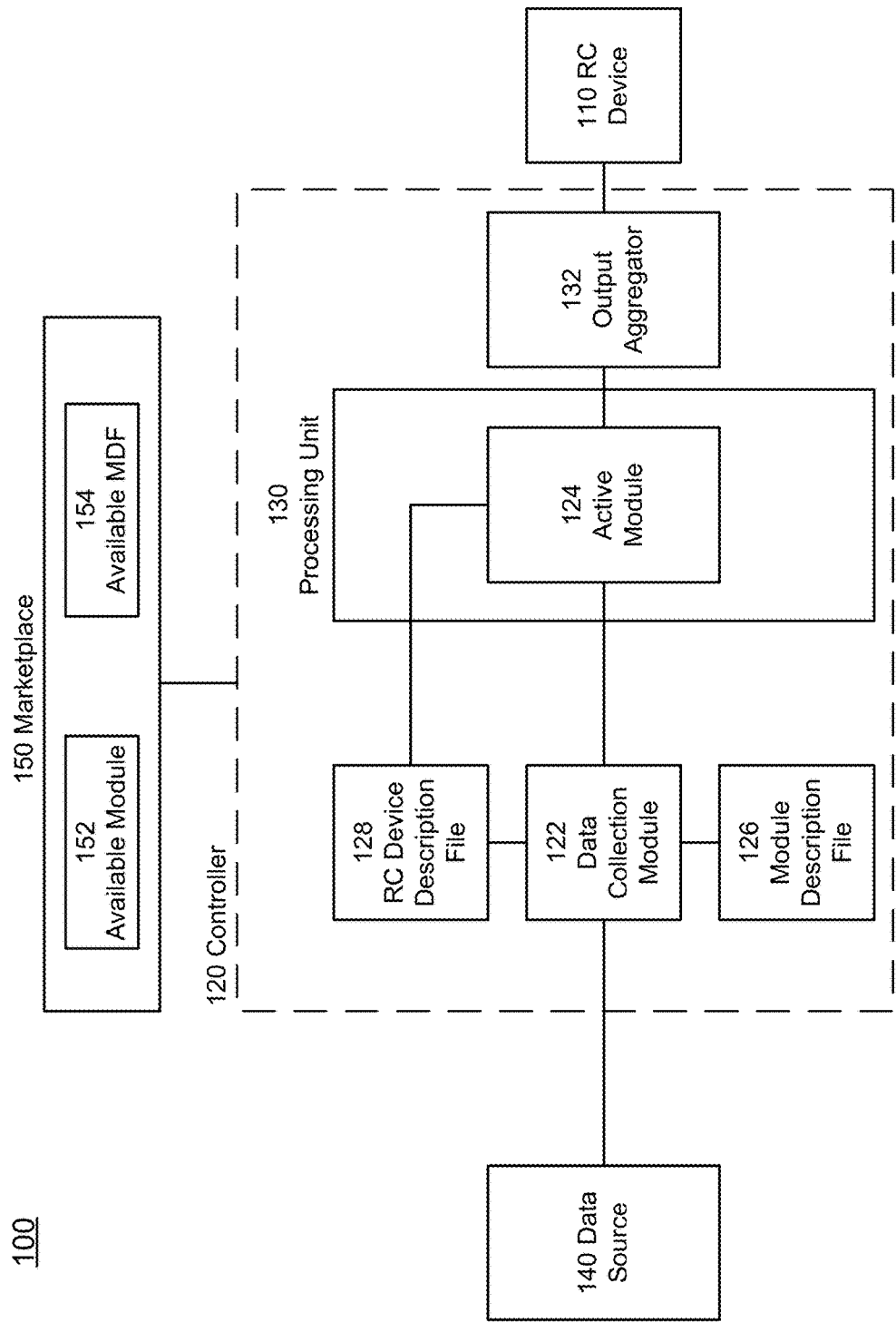
FIG. 1 depicts a functional block diagram of the remotely-controlled device controlling system, in accordance with various embodiments.

Referring now to FIG. 1, an embodiment of a control system of a remotely-controlled device suitable for implementation of the inventive concepts described herein includes at least one remotely-controlled device 110, a controller 120, at least one data source 140, and a marketplace 150.

Remotely-controlled devices 110 could include any remotely-controlled device(s), vehicle(s), and/or swarms of vehicles which is capable of flying through the air, atmosphere, and/or space including, but not limited to, lighter than air vehicles and heavier than air vehicles, wherein the latter may include remotely-controlled quadcopters, fixed-wing, and rotary-wing vehicles. Additionally, remotely-controlled devices 110 could include any remotely-controlled system including legged robots and/or vehicles capable of traversing the surface of the Earth, and/or any watercraft capable of unmanned/autonomous operation on or beneath water. Additionally, remotely-controlled devices 110 could include any in-place mechanical or electrical system capable of autonomous operation.

Controller 120 could include a data collection module 122, at least one active module 124, at least one module description file (MDF) 126, a remotely-controlled device description file (RDF) 128 for each remotely-controlled device, a processing unit (PU) 130, and an optional output aggregator 132. Controller 120 may include a software architecture which facilitates the execution of exchangeable active module(s) 124 that are capable of making decisions on behalf of remotely-controlled devices 110. Controller 120 may also include a means of controlling those remotely-controlled devices 110 in such a way as to achieve a desired outcome, independent of the type of remotely-controlled device 110 connected to controller 120. Controller 120 may be communicatively connected to remotely-controlled device(s) 110.

Data collection module 122 may be configured to receive input data from at least one data source 140. In some embodiments, data collection module 122 may receive data from remotely-controlled device 110 and/or other remotely-controlled devices working in conjunction with the remotely-controlled device 110 in a variety of ways. These could include continual publish/subscribe paradigms and TCP-style request and respond paradigms.

Active modules 124 may enable a wide range of capabilities. Each active module 124 may include executable code of a functional algorithm which, when employed, could enable a specific operation of the remotely-controlled device 110. If purchased, subscribed, and/or licensed from marketplace 150, active modules 124 may automatically be made unavailable once a time period has expired or a usage limit has been reached. In some embodiments, multiple active modules 124 may be used simultaneously.

The following is a small, non-exhaustive list of example active modules 124 provided for the purpose of illustration and not of limitation: cinematic following; pedestrian detection and avoidance for autonomous vehicles (e.g., self-driving cars); obstacle avoidance; gesture recognition; signal processing; path planning in complex, obstructed environments; SLAM (Simultaneous Localization And Mapping); object recognition; object tracking; voice commands/natural language processing; emotion detection (e.g., the person I'm interacting with is sad/happy/angry); manipulator path planning (for remotely-controlled arms); full-coverage path planning (e.g. make sure a cleaning robot covers the entire floor, or a farming robot covers an entire field); returning to a charging station (e.g., when batteries are low, or when a task is completed); searching for objects (e.g., in an unconstrained way or within an established search radius/area); following a line; and enabling swarm behavior (e.g., groups of robots maneuvering together, sometimes to accomplish some task).

Active modules 124 could also include foundational capabilities that can be used as inputs into more complex and higher-level decision-making processes, or that can be used directly in the execution of basic tasks. For example, an optical flow module (e.g., measuring how far things move between frames in a video) could be employed in quadcopter hovering stabilization. In another example, plug-and-play computer vision modules such as edge detection could be used as a pre-processing step in transforming image data into the format required by a higher-level semantic segmentation module, the output of which could then in turn be used as an input into an object recognition module.

Active modules 124 could receive input data from data collection module 122. Active modules 124 may also receive information found in RDF 126 directly to retrieve relevant static variable values (e.g. the dimensions of the robot). Each active module 124 may require a specific type(s) of data as inputs. Information regarding data required by each active module 124 may be provided in MDF 126.

MDF 126 may be associated with one active module 124. In some embodiments, MDF 126 may identify specific categories of remotely-controlled devices 110 which may employ output data generated by the active module 124 associated with the MDF 126. In some embodiments, MDF 126 may include information including, but not limited to, requirements for data types, data formats, data update frequency, and sensor placement on the robot (e.g. "in the center, at the front, within 2 inches of the ground"). In some embodiments, MDF 126 could include subscription/purchase/license status or expiration date information, which may be capable of turning the active module 124 associated with the MDF 126 off/on, and/or may be replaced. In some embodiments, MDF 126 may describe categories or specific instances of other available modules 152 with which the active module 124 associated with the MDF 126 is or is not interoperable.

RDF 128 could be associated with one remotely-controlled device 110 and include physical descriptions and dimensions of the remotely-controlled device 110. In some embodiments, RDF 128 could provide input to at least one active module 124. In some embodiments, RDF 128 could be used to automatically determine the compatibility of the remotely-controlled device 110 with an available module 152 in the marketplace 150, and to automatically prevent that available module 152 from being acquired as an active module 124 for use with the remotely-controlled device 110 described by RDF 128.

PU 130 could include any electronic data processing unit which executes software or computer instruction code that could be stored, permanently or temporarily, in a digital memory storage device or a non-transitory computer-readable media including, but not limited to, random access memory (RAM), read-only memory (ROM), compact disc (CD), hard disk drive, diskette, solid-state memory, Personal Computer Memory Card International Association card (PC-MCIA card), secure digital cards, and compact flash cards. PU 130 may be driven by the execution of software or computer instruction code containing algorithms developed for the specific functions embodied herein. PU 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, PU 130 could also include more than one electronic data processing unit. In some embodiments, PU 130 could be a processor(s) used by or in conjunction with any other system employed herein. In some embodiments, PU 130 could be embedded within remotely-controlled device 110. In some embodiments, PU 130 could be embedded within a manual input device. In some embodiments, PU 130 could be located remotely and connected to controller 120 via wired or wireless data transmission linkages.

In some embodiments, the terms "programmed" and "configured" are synonymous. PU 130 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by PU 130 via a physical or a virtual computer port. PU 130 may be programmed or configured to execute the method discussed in detail below.

Output aggregator 132 may be configured to receive output data generated by one or more active modules 124. Active modules 124 may or may not be required to format output data in standardized forms (e.g. "a single number with two decimal places"). An output standardizer may be used to transform raw outputs into specific formats. Outputs from each active module 124 are collected by output aggregator 132, combined, and sent to remotely-controlled device 110 using a data transmission protocol. Results may be also be transmitted to a mobile device (e.g. a smartphone or dedicated receiver) for visualization and real-time feedback, or used as input data provided to data collection module 122 for subsequent use by active module 124.

Data source 140 could include any device(s) configured to provide as input data the specific data required by the active module(s) 124 that are specified in the MDF 126 associated with the active module 124. Data source 140 could include an embedded sensor, a directly connected sensor, a remotely-controlled device-attached sensor, and non-sensor data such as, but not limited to, data input manually to a device (e.g. a smartphone) data pulled from an online database, data accessed through a third-party API, or data provided as an output of a different active module 124. Sensors may be embedded in controller 120, directly connected (e.g., "plugged in") to controller 120, and/or attached to the remotely-controlled device 110. Data collection module 122 may be configured to read values directly from the sensors, or it may receive such data by way of intermediate processes (for example, such an intermediate process may normalize or otherwise transform the data before sending the data to data collection module 122).

Marketplace 150 may be any source from which a plurality of available modules 152 and a plurality of available MDFs 154 associated with the plurality of available modules 152 may be obtained; once obtained and provided to controller 120, available modules 152 and available MDFs 154 may become active modules 124 and active MDFs 126, respectively. Available modules 152 may be applied to specific remotely-controlled devices and/or fleets of remotely-controlled devices. In some embodiments, only available modules 152 compatible with a specific remotely-controlled device 110 will be allowed to be purchased. Marketplace 150 may include descriptions of the different available modules 152, a ranking or rating system, comments from other users, lists of similar available modules 152, lists of available modules 152 that can work in concert with other available modules 152, price information, and promotions. In some embodiments, a trial period may be available so that available modules 152 may be employed temporarily without payment.

Marketplace 150 may include a dashboard for controlling which available modules 152 are now active modules 124 for a given fleet of remotely-controlled devices 110. This dashboard may be used to turn active modules 124 on/off and/or re-order a priority given to various active modules 124. A user may also configure its active modules 124 or remotely-controlled devices 110, for example, by entering specific required or optional details (e.g. the location of a sensor on the robot, or the type of object to be tracked). Changes made in the dashboard may be reflected in associated active MDF(s) 126 and RDF(s) 128.

Figure 2A:
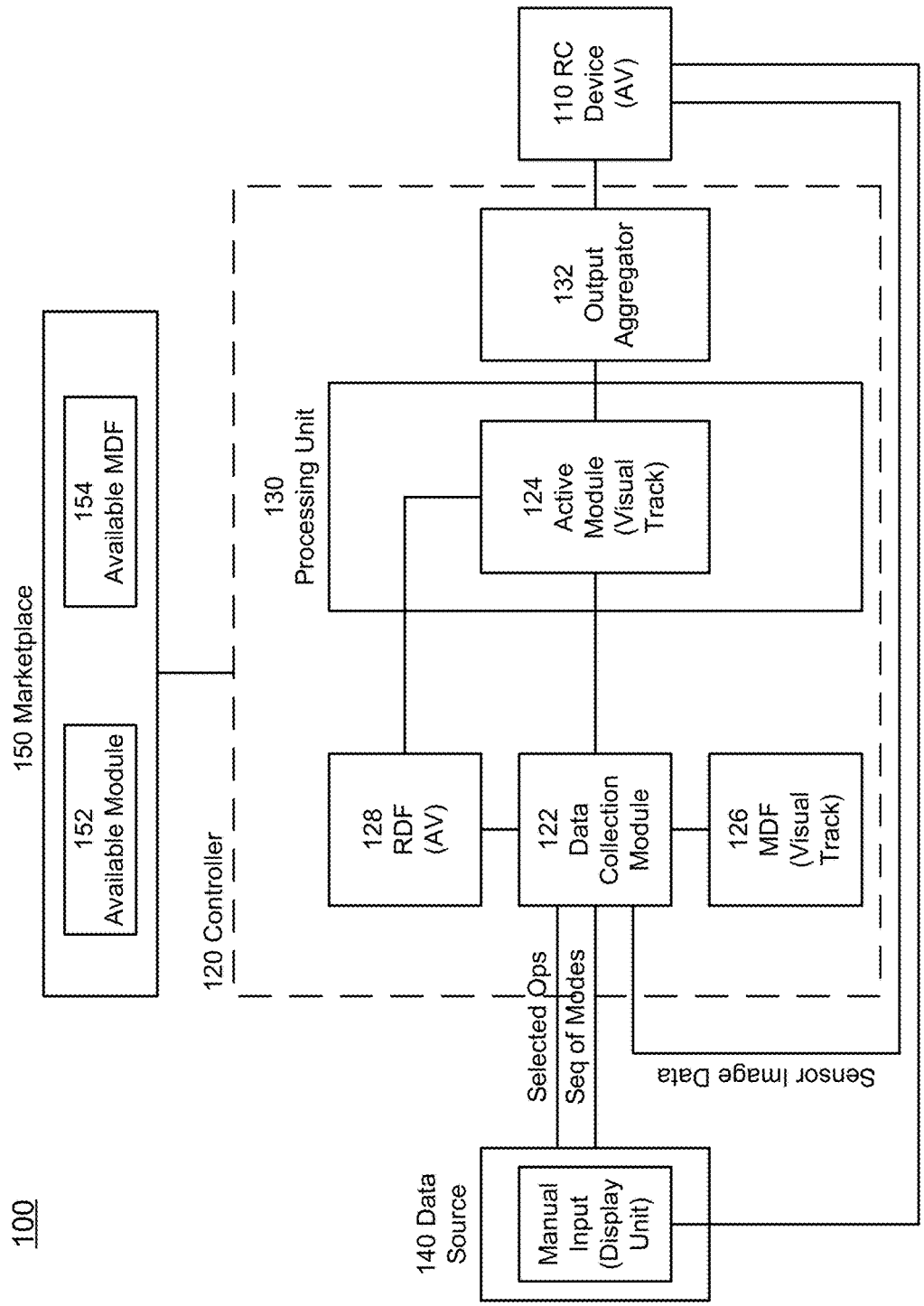
FIGS. 2A-2B depict an exemplary configuration of the remotely-controlled device controlling system, in accordance with various embodiments.
Figure 2B:
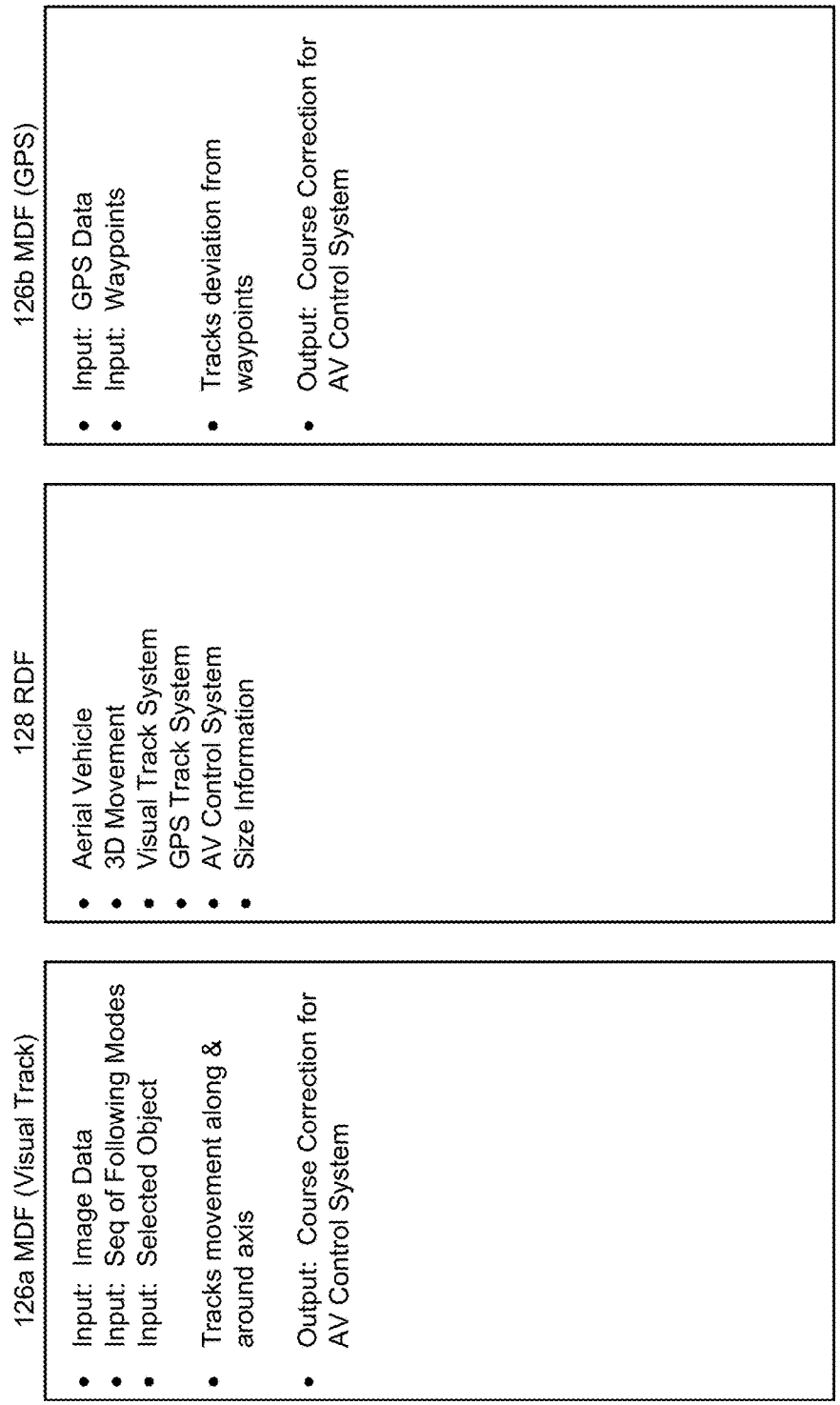

Referring now to FIGS. 2A and 2B, an exemplary embodiment of one possible configuration of the system 100 is illustrated in accordance with various embodiments. For the purpose of discussion, it will be assumed that the remotely-controlled device 110 is an autonomous vehicle (AV) which the operator would like to employ to capture cinema-quality videos of a person (object of the video) strolling along a beach, and that the AV is equipped with a stationary camera. Instead of manually operating the AV while watching the video to keep the person centered in the image, the operator would like the AV to follow the person autonomously.

As shown in FIGS. 2A and 2B, system 100 includes active module 124 obtained from marketplace 150 that is configured with a visual tracking algorithm, i.e., a visual tracking module. Data inputs required for the visual tracking module are identified in the associated MDF 126 a as image data (representative of an image located outside the AV), a sequence of following modes, and a selected object (within the image). As shown, these required data inputs are provided to data collection module 122 by MDF 126a. The image data input originates from the fixed camera present on the AV, is transmitted to the Display Unit for the user to view, and is passed on from the Display Unit to the data collection module 122. The sequence of following modes and the selected object to be tracked are set by the user via the Manual Input Device (e.g. via a touch interface on a smartphone), then passed to the data collection module 122. The data collection module 122 then passes all required inputs to the visual tracking module 124 which, in turn, generates output data identified as course correction data employed by the AV control system that will be provided to the AV control system (i.e., the destination system).

As shown in RDF 128, the AV is configured with a GPS system as well as the visual tracking system and the AV control system. If the operator wished to track the strolling person via a series of waypoints, system 100 could be configured with an active module 124 obtained from marketplace 150 that is configured with a GPS system algorithm, i.e., a GPS system module. Data inputs required for the GPS system module are identified in the associated MDF 126b as GPS location and waypoints (which define the course of flight of the AV). GPS location is periodically provided by a GPS sensor embedded in the AV, and is transmitted by way of the Manual Input Device to the data collection module 122. GPS waypoints are periodically provided by a GPS sensor in the Display Unit, which the strolling person carries with them, and are passed to the data collection module 122. The output data generated by GPS system module is representative of course correction data employed by the AV control system that will be provided to the AV control system (i.e., the destination system).

Figure 3:
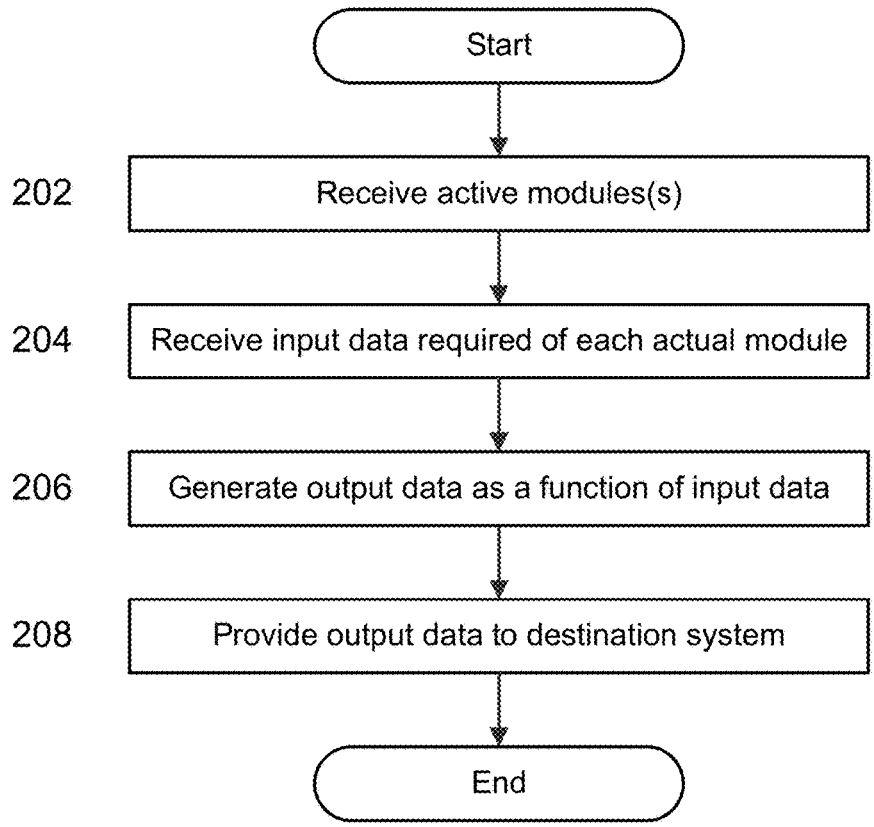
FIG. 3 depicts an exemplary embodiment of a flowchart disclosing a method for controlling remotely-controlled devices, in accordance with various embodiments.

FIG. 3 depicts flowchart 200 disclosing an example of a method for controlling a remotely-controlled device, where PU 130 may be programmed or configured with instructions corresponding to the modules embodied in flowchart 200. In some embodiments, PU 130 may be a processor or a combination of processors found in controller 120, or any other system suitable for performing the task. Also, PU 130 may be a processor of a module such as, but not limited to, a printed circuit card having one or more input interfaces to facilitate the two-way data communications of PU 130, i.e., the receiving and sending of data, the latter being synonymous with a providing and/or transmitting of data. As necessary for the accomplishment of the following modules embodied in flowchart 200, the acquiring of data is synonymous and/or interchangeable with the receiving and/or retrieving of data, and the providing of data is synonymous and/or interchangeable with the making available or supplying of data.

The method of flowchart 200 begins with module 202 with PU 130 receiving one or more active modules 124 that have been obtained from marketplace 150 as one or more available modules 152. In some embodiments, marketplace 150 may be available to one or more manufacturers of the remotely-controlled devices 110. In some embodiments, marketplace 150 may be available to one or more owners and/or operators of remotely-controlled devices 110.

The method of flowchart 200 continues with module 204 with PU 130 receiving input data required by each active module 124 from data collection module 122. Data collection module 122 could have received active MDF 126 for each active module 124, where each active MDF 126 may include identification data. The identification data may be representative of the specific input(s) required by its associated active module 124. The identification data may be representative of the name and/or address of data source 140 for each specific input. In some embodiments, a plurality of specific inputs may be provide by one data source 140. Once the identification of the input data source(s) is known, data collection module 122 could receive input data from each and provide it to PU 130.

The method of flowchart 200 continues with module 206 with PU 130 generating, for each active module of the plurality of active modules 124, output data by applying a functional algorithm which, when employed, could enable a specific operation of remotely-controlled device 110.

The method of flowchart 200 continues with module 208 with PU 130 providing the output data to a destination system. In some embodiments, the destination system could be a system found on remotely-controlled device 110. In some embodiments, the destination system could be output aggregator 132 configured to combine data and send the combined data to a system found on remotely-controlled device 110. Then, the method of flowchart 200 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the broad scope of the inventive concepts disclosed herein. It is intended that all modifications, permutations, enhancements, equivalents, and improvements thereto that are apparent to those skilled in the art upon a reading of the specification and a study of the drawings are included within the broad scope of the inventive concepts disclosed herein. It is therefore intended that the following appended claims include all such modifications, permutations, enhancements, equivalents, and improvements falling within the broad scope of the inventive concepts disclosed herein.

What is claimed is:

1. A system for controlling a remotely-controlled device, comprising:
a marketplace having at least one available module and at least one available module description file (MDF);
a plurality of input data sources;
at least one remotely-controlled device;
at least one active module and at least one active MDF, where
each active MDF is associated with one active module and includes identification data representative of:
at least one input required by its associated active module; and
a source identification of at least one input data source of the plurality of input data sources for the at least one input required by its associated active module, where
each available module and each active module are defined as being processor-executable code of an operation of the at least one remotely-controlled device; and
a processing unit comprised of at least one processor coupled to a processor-readable medium storing processor-executable code of the at least one active module, the processing unit being configured to:
receive the at least one active module;
receive, for each received active module, input data representative of the at least one input required by its associated MDF;
generate output data as a function of at least the input data; and
provide the output data to a destination system, whereby
an operation of the at least one remotely-controlled device is responsive to the output data.

2. The system of claim 1, wherein the at least one remotely-controlled device comprises a fleet of remotely-controlled devices.

3. The system of claim 1, further comprising:
a description file associated with one remotely-controlled device and comprising information corresponding to at least one of a physical characteristic and a system configuration of its associated remotely-controlled device.

4. The system of claim 3, wherein the processing unit is further configured to:
receive the description file, and
determine a compatibility of at least one available module of the marketplace with the one remotely-controlled device associated with the description file, whereby
each incompatible available module is prevented from being received from the marketplace by the processing unit.

5. The system of claim 1, wherein each active module and each active MDF are one available module and one available MDF, respectively, that have been received from the marketplace.

6. The system of claim 1, wherein the identification data is further representative of at least of a data type and a data format specified for the output data.

7. The system of claim 1, wherein the destination system is the at least one remotely-controlled device or an output aggregator configured to combine the output data and provide the combined output data to the at least one remotely-controlled device.

8. The system of claim 1, further comprising:
a data collection module configured to:
receive, from each MDF, the identification data;
receive, for each received MDF, the input data from the plurality of input data sources based upon the identification data; and
provide the input data to the processing unit.

9. A device for controlling a remotely-controlled device, comprising:
a processing unit comprised of at least one processor coupled to a processor-readable medium storing processor-executable code of at least one active module, the processing unit being configured to:
receive the at least one active module, where each received active module is defined as being the processor-executable code of an operation of at least one remotely-controlled device and associated with one active module description file (MDF) that includes identification data representative of:
at least one input required by its associated active module, and
a source identification of at least one input data source of a plurality of input data sources for the at least one input required by its associated active module;
receive, for each received active module, input data representative of the at least one input required by its associated MDF;
generate output data as a function of at least the input data, and
provide the output data to a destination system, whereby
an operation of the at least one remotely-controlled device is responsive to the output data.

10. The device of claim 9, wherein each active module and each active MDF are one available module and one available MDF, respectively, that have been received from a marketplace having at least one available module and at least one available MDF.

11. The device of claim 9, wherein the processing unit is further configured to:
receive a description file associated with one remotely-controlled device and comprising information corresponding to at least one of a physical characteristic and a system configuration of its associated remotely-controlled device, and
determine a compatibility of at least one available module of the marketplace with the one remotely-controlled device associated with the description file, whereby
each incompatible available module is prevented from being received from the marketplace by the processing unit.

12. The device of claim 9, wherein the identification data is further representative of at least of a data type and a data format specified for the output data.

13. The device of claim 9, wherein the destination system is the at least one remotely-controlled device or an output aggregator configured to combine the output data and provide the combined output data to the at least one remotely-controlled device.

14. The device of claim 9, wherein the input data is received from a data collection module configured to:
receive, from each MDF, the identification data; and
receive, for each received MDF, the input data from a plurality of input data sources based upon the identification data.

15. A method for controlling a remotely-controlled device, comprising:
receiving, by a processing unit comprised of at least one processor coupled to a processor-readable medium storing processor-executable code of at least one active module, each active module defined as being the processor-executable code of an operation of at least one remotely-controlled device and associated with one active module description file (MDF) that includes identification data representative of:
at least one input required by its associated active module, and
a source identification of at least one input data source of a plurality of input data sources for the at least one input required by its associated active module;
receiving, for each received active module, input data representative of the at least one input required by its associated MDF;
generating output data as a function of at least the input data; and
providing the output data to a destination system, whereby
an operation of the at least one remotely-controlled device is responsive to the output data.

16. The method of claim 15, wherein each active module and each active MDF are one available module and one available MDF, respectively, that have been received from a marketplace having at least one available module and at least one available MDF.

17. The method of claim 15, further comprising:
receiving a description file associated with one remotely-controlled device and comprising information corresponding to at least one of a physical characteristic and a system configuration of its associated remotely-controlled device, and
determining a compatibility of at least one available module of the marketplace with the one remotely-controlled device associated with the description file, whereby
each incompatible available module is prevented from being received from the marketplace by the processing unit.

18. The method of claim 15, wherein the identification data is further representative of at least of a data type and a data format specified for the output data.

19. The method of claim 15, wherein the destination system is the at least one remotely-controlled device or an output aggregator configured to combine the output data and provide the combined output data to the at least one remotely-controlled device.

20. The method of claim 15, wherein the input data is received a data collection module configured to:
receive, from each MDF, the identification data; and
receive, for each received MDF, the input data from a plurality of input data sources based upon the identification data.

* * * * *